United States Patent
Brillon et al.

(10) Patent No.: US 11,209,045 B2
(45) Date of Patent: Dec. 28, 2021

(54) DUAL LAND JOURNAL BEARINGS FOR A COMPOUND PLANETARY SYSTEM

(71) Applicant: PRATT & WHITNEY CANADA CORP., Longueuil (CA)

(72) Inventors: Louis Brillon, Varennes (CA); Martin Poulin, Mont Saint-Hilaire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 8 days.

(21) Appl. No.: 16/802,715

(22) Filed: Feb. 27, 2020

(65) Prior Publication Data
US 2021/0254659 A1  Aug. 19, 2021

Related U.S. Application Data

(60) Provisional application No. 62/976,585, filed on Feb. 14, 2020.

(51) Int. Cl.
*F16C 17/02* (2006.01)
*F16H 57/04* (2010.01)
*F16H 57/08* (2006.01)

(52) U.S. Cl.
CPC .......... *F16C 17/02* (2013.01); *F16H 57/0479* (2013.01); *F05D 2240/54* (2013.01); *F16H 2057/085* (2013.01)

(58) Field of Classification Search
CPC ........ F16C 17/02; F16C 17/26; F16H 57/022; F16H 57/0471; F16H 57/0479; F16H 2057/085; F05D 2240/54
See application file for complete search history.

(56) References Cited

U.S. PATENT DOCUMENTS

| | | | |
|---|---|---|---|
| 3,390,926 A * | 7/1968 | Woollenweber, Jr. | F01D 25/166 384/287 |
| 6,168,403 B1 * | 1/2001 | Bush | F01C 21/02 384/192 |
| 6,223,616 B1 * | 5/2001 | Sheridan | F16H 1/2827 184/6.12 |
| 6,467,669 B1 * | 10/2002 | Okada | F16C 23/041 226/194 |
| 8,899,916 B2 | 12/2014 | McCune et al. | |
| 9,222,511 B2 * | 12/2015 | Lee | F16C 33/1065 |
| 9,732,800 B2 * | 8/2017 | Deng | F16C 17/26 |
| 10,260,516 B2 * | 4/2019 | Shi | F04D 29/4206 |
| 10,371,250 B2 * | 8/2019 | Klein-Hitpass | F16H 57/08 |
| 10,851,671 B2 * | 12/2020 | Simard-Bergeron | F16C 17/02 |
| 2018/0299006 A1 * | 10/2018 | Hoelzl | F16H 57/082 |
| 2018/0334964 A1 * | 11/2018 | Desjardins | F02C 7/06 |
| 2019/0162292 A1 | 5/2019 | Nique et al. | |

* cited by examiner

*Primary Examiner* — James Pilkington
(74) *Attorney, Agent, or Firm* — Norton Rose Fulbright Canada LLP (57) ABSTRACT

A journal bearing assembly for rotatably supporting at least one gear, comprising a pin and a journal shaft. The journal shaft includes an inner cavity receiving the pin and an outer surface including a plurality of contact surfaces supporting the at least one gear and at least one annular groove separating adjacent contact surfaces. The pin is configured to support the journal shaft at a support position in the inner cavity.

18 Claims, 7 Drawing Sheets

FIG - 7 a patent page

DUAL LAND JOURNAL BEARINGS FOR A COMPOUND PLANETARY SYSTEM

TECHNICAL FIELD

The present disclosure relates generally to mounting devices for rotating assemblies of gas turbine engines, and more particularly to journal bearings for such engines.

BACKGROUND OF THE ART

Turbine engines typically include a number of rotating components or parts mounted together via mounting devices providing suitable support and allowing axial and/or rotational movement between such components. Those mounting devices may be journal bearings. Long journal bearings with high length-to-diameter ratios typically require various compliance features such as compliance wings or the like to reduce local stiffness and decrease the journal pressure. The large radial space taken by these compliance features may reduce the possible diameter of the pin passing through the journal bearing, which may thus be subjected to undesirable higher bending deformations under load.

SUMMARY

In one aspect, there is provided a journal bearing assembly for rotatably supporting at least one gear, comprising a pin, and a journal shaft including an inner cavity receiving the pin and an outer surface including a plurality of contact surfaces supporting the at least one gear and at least one annular groove separating adjacent contact surfaces, wherein the pin is configured to support the journal shaft at a support position in the inner cavity.

In another aspect, there is provided a gas turbine engine comprising a gearbox having a plurality of gears, and a journal bearing assembly including a supporting pin and a journal shaft including an inner cavity receiving the supporting pin and an outer surface including a plurality of contact surfaces rotatably supporting at least one of the plurality of gears and at least one annular groove separating adjacent contact surfaces.

In a further aspect, there is provided a method for rotatably supporting at least one gear in a gearbox, comprising mounting the at least one gear onto a journal bearing assembly including a journal shaft and a pin insertable into an inner cavity of the journal shaft, and positioning at least two contact surfaces on an outside surface of the journal shaft to rotatably support the at least one gear, the at least two contact surfaces separated by an annular groove.

DESCRIPTION OF THE DRAWINGS

Reference is now made to the accompanying figures in which.

DETAILED DESCRIPTION

Figure 1:
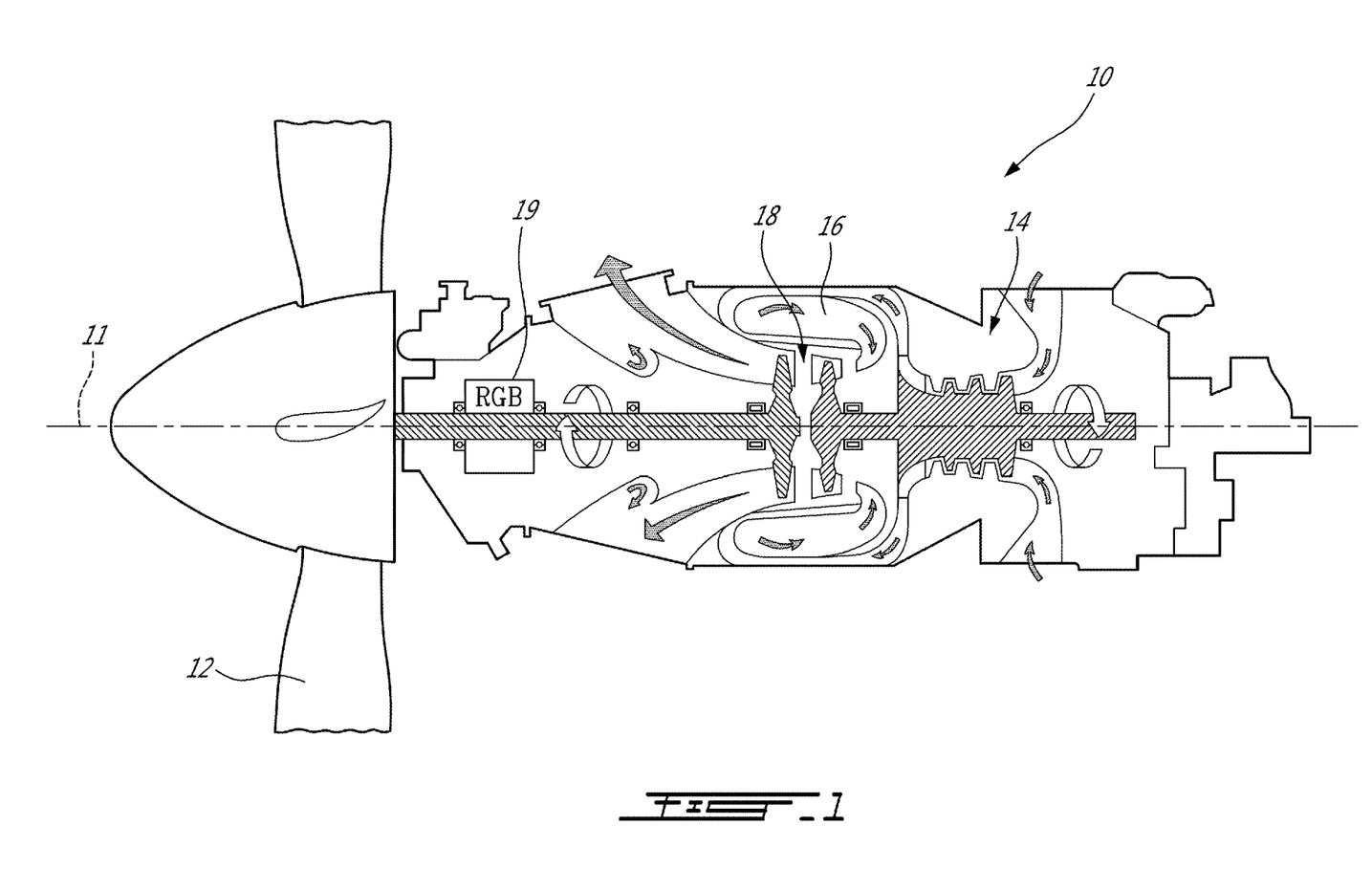
FIG. 1 is a schematic sectional view of a gas turbine engine with a bearing assembly of the present disclosure.

FIG. 1 illustrates a gas turbine engine 10 of a type preferably provided for use in subsonic flight and configured for driving a load 12, such as, but not limited to, a propeller or a helicopter rotor or rotorcraft rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10. Even though the present description specifically refer to a turboprop engine as an example, it is understood that aspects of the present disclosure may be equally applicable to other types of combustion engines in general, and other types of gas turbine engines in particular, including but not limited to turboshaft or turbofan engines, auxiliary power units (APU), and the like.

Figure 2:
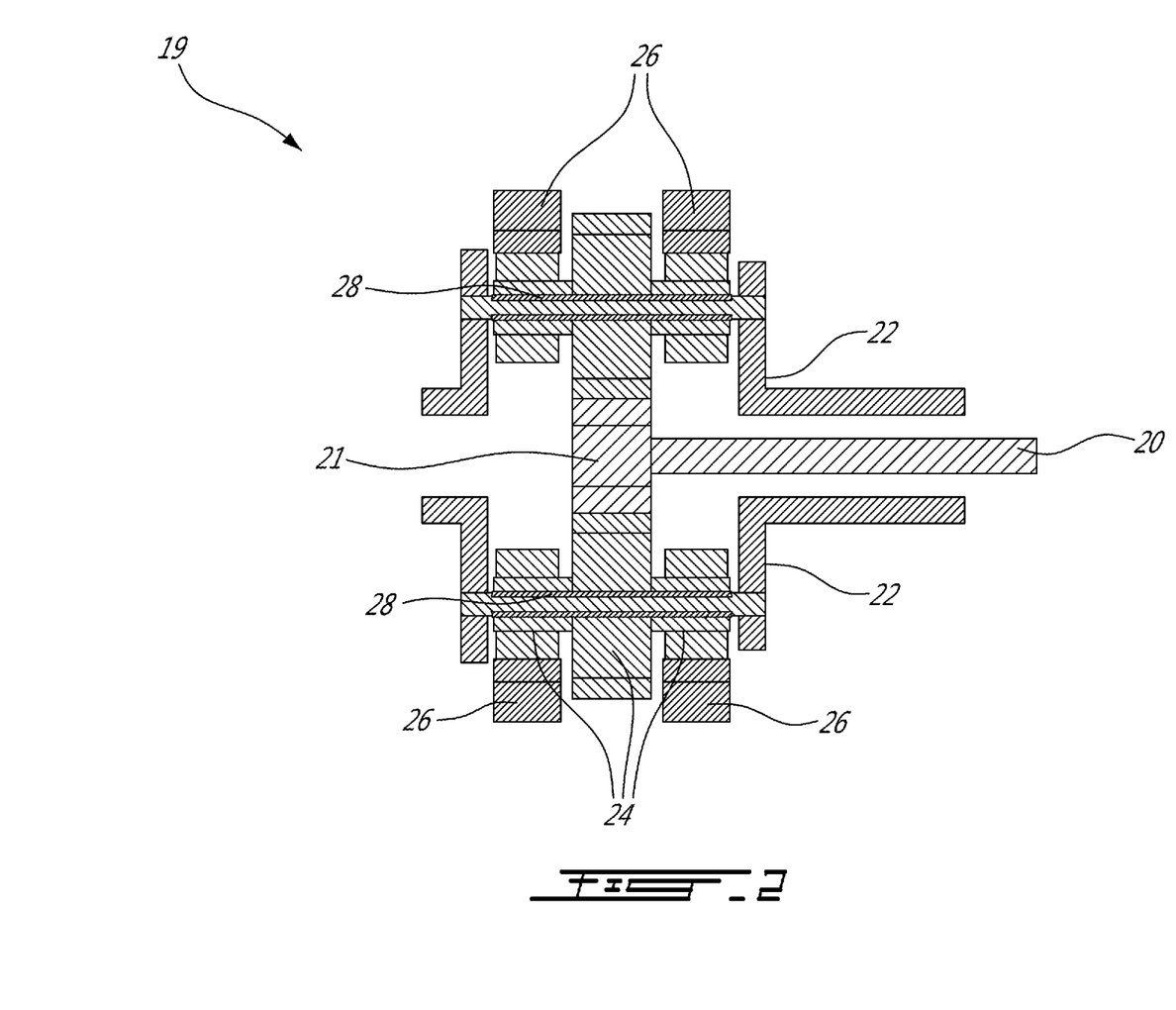
FIG. 2 is a schematic cutaway perspective view of a gear assembly as used in the engine of FIG. 1 and showing a journal bearing assembly, according to an embodiment of the present disclosure.

The gas turbine engine 10 also includes rotating parts or assemblies, such as gear assemblies 19 (e.g., epicycle reduction systems, planetary/reduction gearboxes (RGB), or other types of rotating assemblies) with rotating components mounted thereto using mounting devices allowing rotational and/or axial movement. In the embodiment shown, the gear assembly 19 is mounted at the front end of the engine 10, though it may be at other locations in the engine 10. An example of a gear assembly 19 as used in the engine 10 is shown in FIG. 2. In the depicted embodiment, the gear assembly 19 is part of a compound epicycle reduction system, also known as epicyclic gear train, epicyclic gearbox, planetary gearbox, etc. As a contemplated embodiment among others, an input torque through a sun shaft 20 is rotatably outputted through a sun gear 21 as an output torque through gear carriers 22 via a plurality of planet gears 24 rotatably connected to the gear carriers 22 and ring gears 26.

Figure 3:
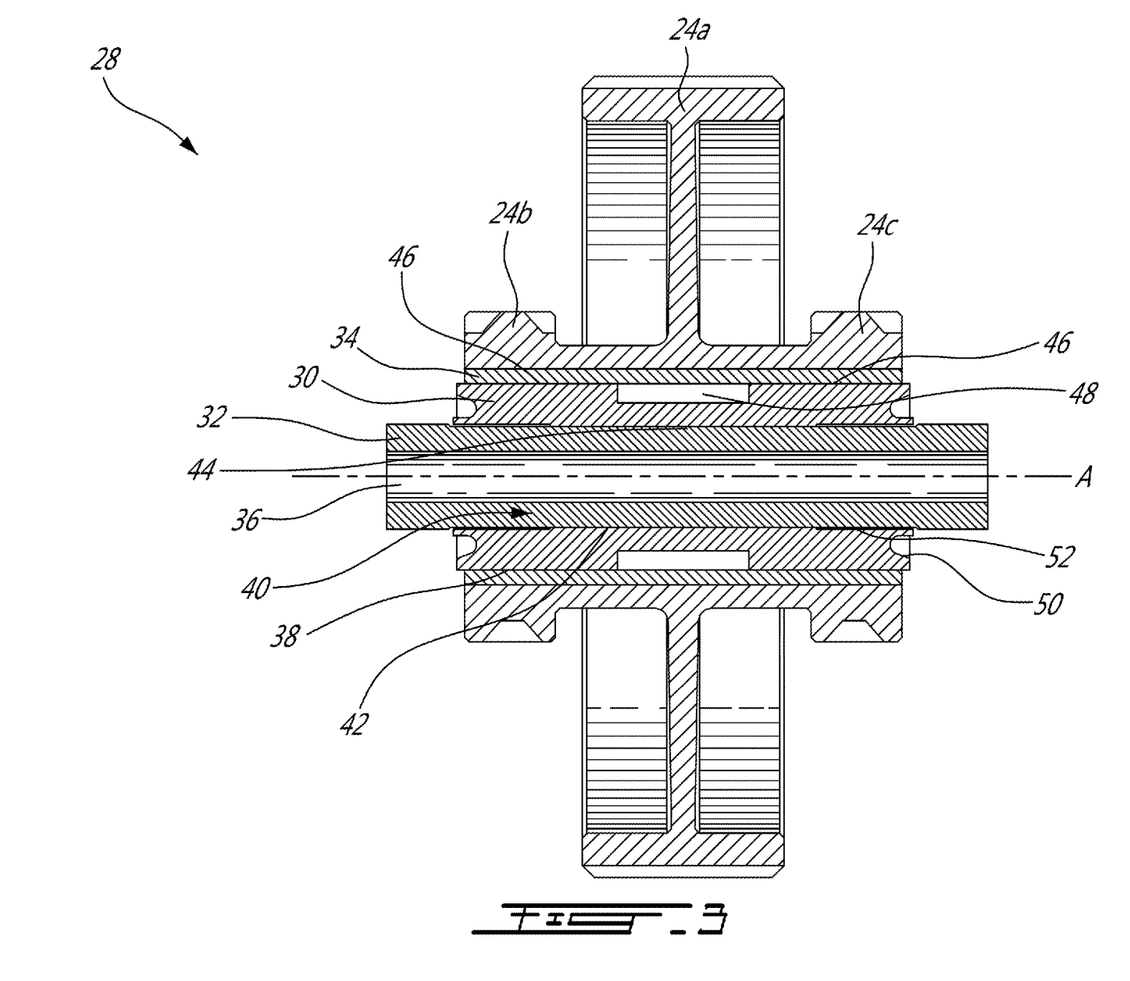
FIG. 3 is a longitudinal section perspective view of an embodiment of a journal bearing assembly according to the present disclosure.

The gear assembly 19 shown in FIG. 2 includes one or more mounting devices such as a journal bearing assembly 28. As shown in FIG. 3, the journal bearing assembly includes a journal shaft 30 (also referred to as a journal or a shaft), a pin 32, and an optional sleeve 34. The journal bearing assembly 28 may be used for interfacing a rotating part to a structure. In the example shown, the rotating part is one or more gears such as planet gears 24, although other arrangements are possible. The gear may be an epicycle gear of epicyclic reduction system, mounted on the journal bearing assembly 28 which is supported at both ends between two axially spaced supports forming at least part of the structure of the epicyclic gear system, the structure being for instance a carrier 22. In an embodiment, there are a plurality of planet gears 24 (illustratively three planets 24a, 24b 24c) on the carrier 22, the planet gears 24 being interconnected for concurrent rotation. The supports may be annular blocks (not shown) supporting the pin 32 at its opposed ends. The pin 32 may be hollow with a pin inner cavity 36 (as shown in FIG. 3) and may be optionally closed at one end via a fastener such as a bolt and a washer (not shown). A lubricating fluid film, such as an oil film, may be received between rotating components of the journal bearing assembly 28 to facilitate rotation of said components relative to one another. In addition, the pin inner cavity 36 may include various (not shown) inlet and outlet passages for oil to flow through.

Although not shown, other types of bearings may be used, such as roller bearings, ball bearings or any other suitable types of bearings. The journal bearing assembly 28 may or may not include the sleeve 34 disposed radially outwardly to the journal shaft 30 relative to a longitudinal axis A of the journal bearing assembly 28. Such sleeve 34 may be used to form an outer peripheral surface of the journal bearing assembly 28, upon which the planet gears 24 are mounted in the illustrated embodiment. Otherwise, an outer surface 38 of the journal shaft 30 may contact directly the rotating part it supports, e.g., the planet gears 24 in the illustrated embodiment.

Referring to FIG. 3, an embodiment of a journal bearing assembly 28 is shown. The journal shaft 30 may be a monolithic piece. While journal shaft 30 is shown to be cylindrical, other shapes are possible such as frusto-conical, and the journal shaft may have various surface features such as grooves, slots and channels. The journal shaft 30 extends along the longitudinal axis A, which is the rotation axis of the rotating part, illustratively the three planet gears 24a, 24b, 24c. The journal shaft's outer surface 38 is configured for interfacing and supporting the rotating part either directly or via the optional sleeve 34. A pin-receiving inner cavity 40 (a.k.a., throughhole) extends along the longitudinal axis A and defines a pin-engaging surface 42. The pin-receiving cavity 40 may thus receive the pin 32 of the gear assembly 19 when mounted within such assembly 19. A support position 44 at a given location on the pin-engaging surface 42, illustratively towards the center of the journal shaft 30, allows the pin 32 to support the journal shaft 30. This support position 44 assists in providing local compliance between the rotating part and the journal shaft 30.

Depending on the configuration, the journal bearing assembly 28 may have its journal shaft 30 fixed to the pin 32, such that the sleeve 34 (if present) or the rotating part rotates about the pin 32 and the journal shaft 30. If present, the sleeve 34 concurrently rotates with the rotating part fixed thereon. In another embodiment, the journal bearing assembly 28 may have its journal shaft 30 rotatably engaged with the rotating part it supports, such that the journal shaft 30 may be rotatable relative to the pin 32 and may have the rotating part mounted thereto rotatable relative to the journal shaft 30, for instance with the sleeve 34 fixed to the rotating part or to the journal shaft 30.

In the embodiment shown in FIG. 3, the outer surface 38 of the journal shaft 30 includes a plurality of contact surfaces or journal lands 46 (illustratively two contact surfaces 46) for supporting the rotating part, illustratively the three planet gears 24a, 24b, 24c. An annular groove 48 in the journal shaft 30 separates adjacent contact surfaces 46. While the embodiment of FIG. 3 shows a single annular groove 48 separating two adjacent contact surfaces 46, other arrangements are possible, such as two annular grooves 48 interspersed between three contact surfaces 46. In the shown embodiment, the annular groove 48 is located towards the center of the journal shaft 30 where the journal shaft 30 is typically subjected to less pressure than the rest of the shaft 30, while the now shorter contact surfaces 46 are positioned beneath the areas of increased load. By separating the typically single continuous contact surface into two or more distinct contact surfaces 46, such as ones separated by one or more annular grooves, the local applied pressures may be reduced, which may lead to less of a bending effect along the length of the journal shaft 30. In addition, the two or more contact surfaces 46 may lie mostly concentrically against the rotating part such as the three planet gears 24a, 24b, 24c or the sleeve 34.

The separate contact surfaces 46 convert a traditional journal shaft with a long length-to-diameter ratio into two separate segments with lower length-to-diameter ratios that, in an embodiment, are within general journal bearing best practices. As an example, while the use of journal bearing shafts with length-to-diameter ratios ranging from roughly 0.5 to 1.5 has been put forward, the use of separate contact surfaces 46 taught by the present disclosure may allow for improved performance with longer journal shafts having overall length-to-diameter ratios above 1.5. Longer journal shafts 30 may often be used in compound epicyclic gear systems in which two or more planet gears are on the journal shaft 30. For example, in the illustrated embodiments, three planet gears 24, illustratively a central planet gear 24a positioned between two smaller planet gears 24b, 24c, are arranged along a common shaft 30 and interconnected for concurrent rotation. For example, the larger planet gear 24a may engage sun gear 21, while the smaller planet gears 24b, 24c may engage ring gears 26. In addition, by incorporating two or more contact surfaces 46, the required compliance features 50 at the distal ends of the journal shaft 30, which may be referred to as undercuts or axial depressions, etc, may be made smaller than those in a traditional journal shaft, which may lead to an overall thinner and hence lighter journal shaft 30. Thus, a larger and stiffer pin 32 may be utilized, leading to improved robustness and reliability.

Figure 4:
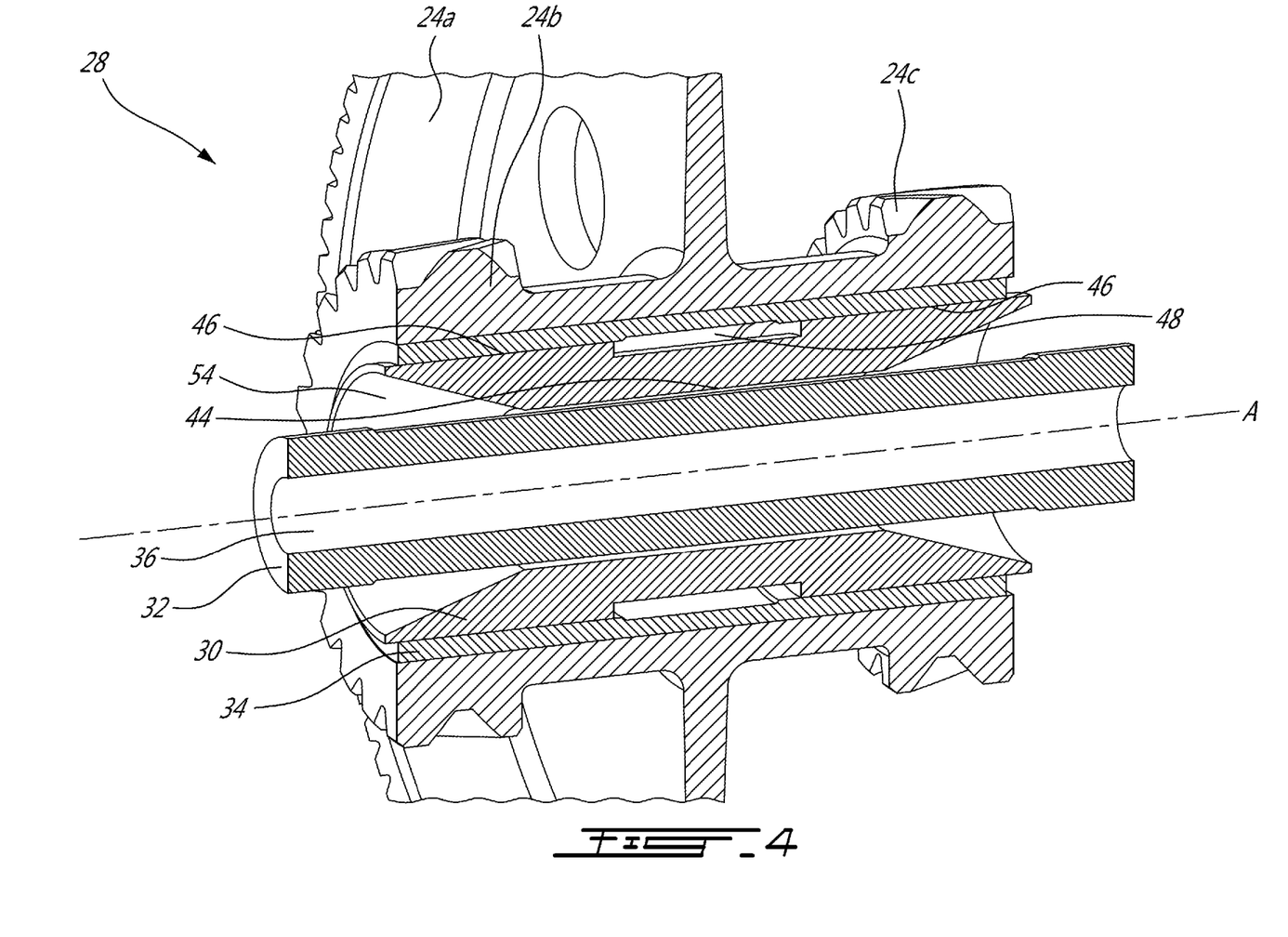
FIG. 4 is a longitudinal section perspective view of another embodiment of a journal bearing assembly according to the present disclosure.

In an embodiment, a compliance gap 52 at each distal end of the journal shaft 30 may add flexibility to the journal bearing assembly 28. Such compliance gaps 52 may be implemented in a plurality of ways. In the embodiment shown in FIG. 3, the journal shaft 30 includes a recess 54 at each distal end thereof to allow for greater flexibility in case of any bending. In the embodiment shown in FIG. 5, these recesses 54 may include curved profiles to account for greater bending effects. Alternatively, each end of the journal shaft 30 may include tapered profiles adding additional compliance, as shown in FIG. 4. The surface of the recesses 54 may be defined as having a frusto-conical geometry. In another embodiment, the surface of the recesses 54 may be defined as having a countersink shape.

Figure 5:
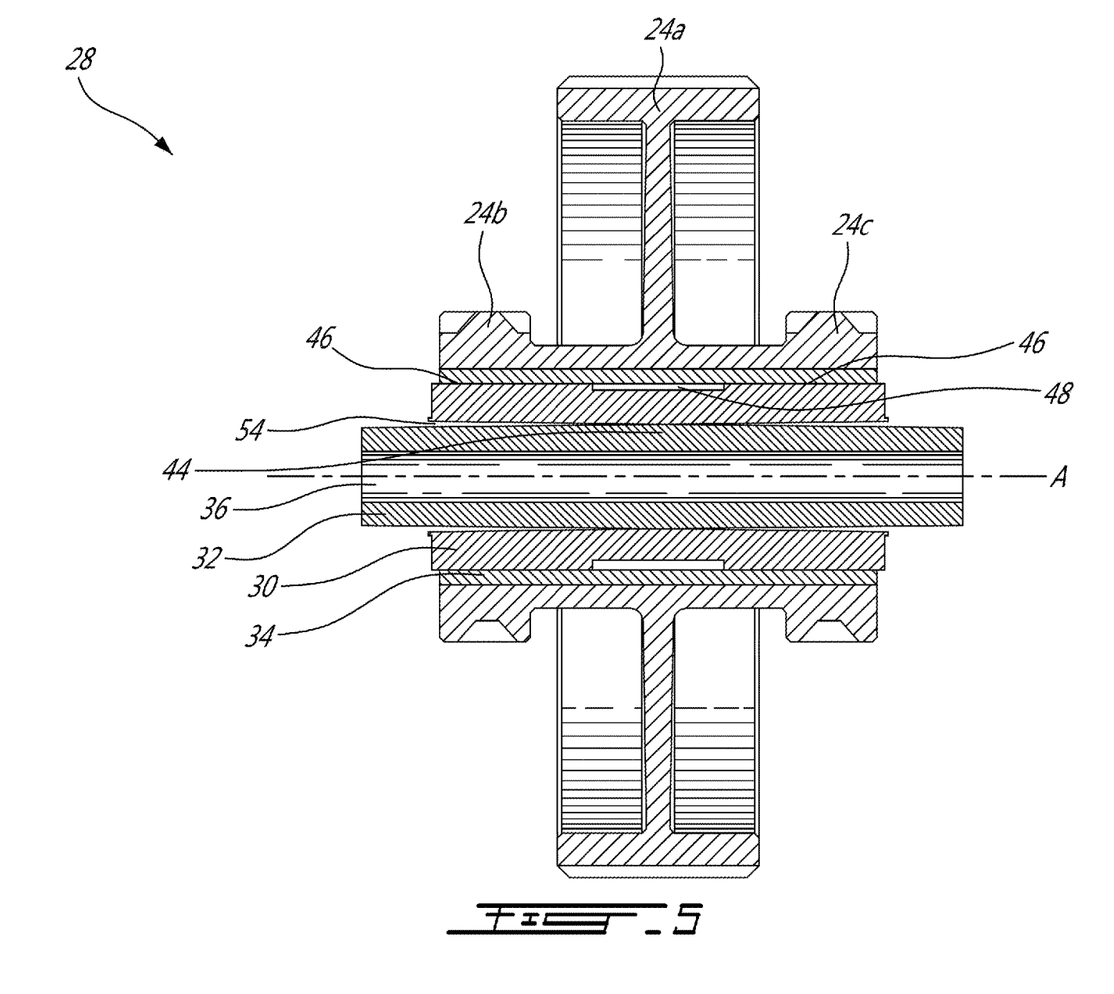
FIG. 5 is a longitudinal section perspective view of another embodiment of a journal bearing assembly according to the present disclosure.
Figure 6:
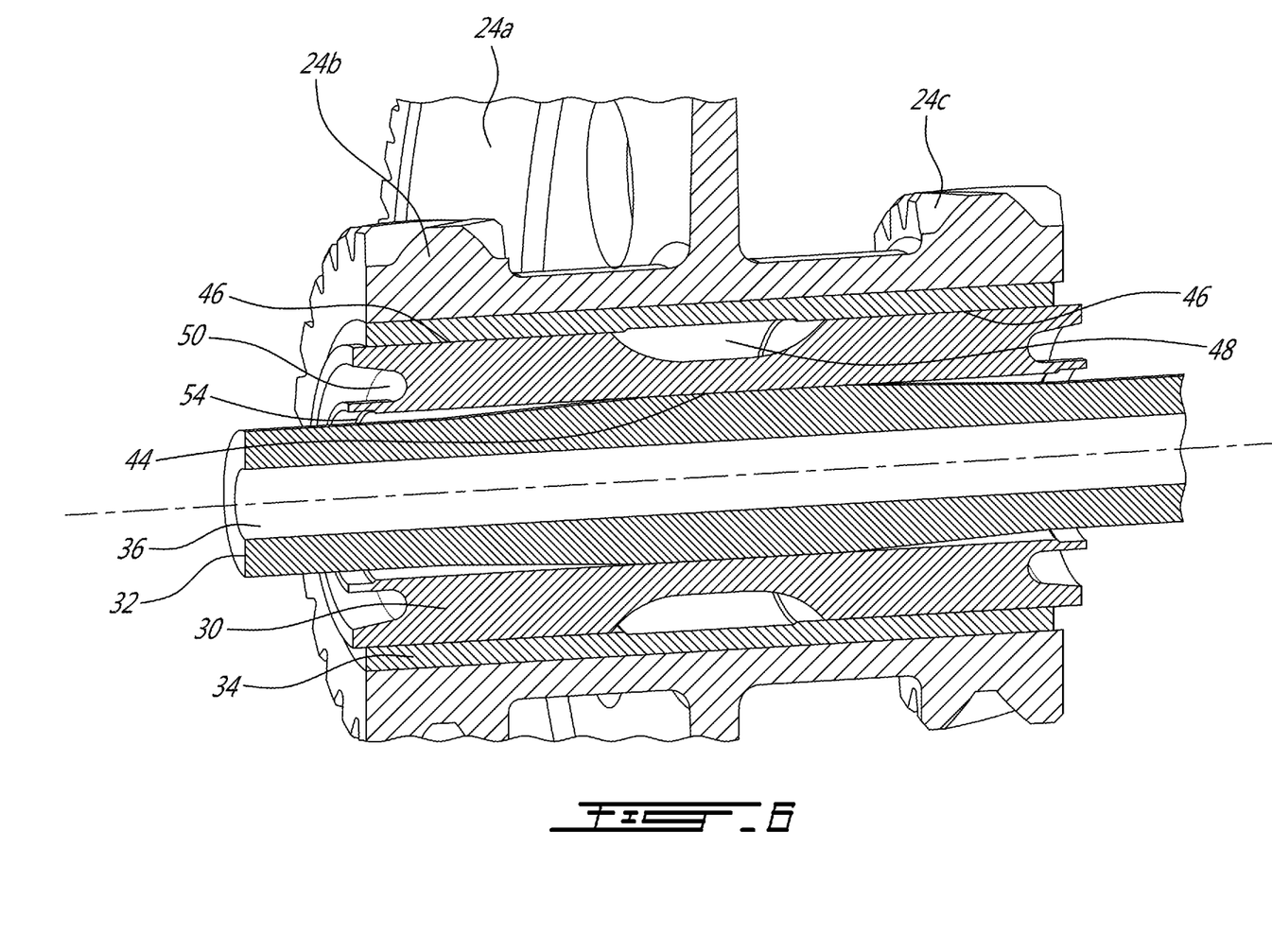
FIG. 6 is a longitudinal section perspective view of another embodiment of a journal bearing assembly according to the present disclosure.
Figure 7:
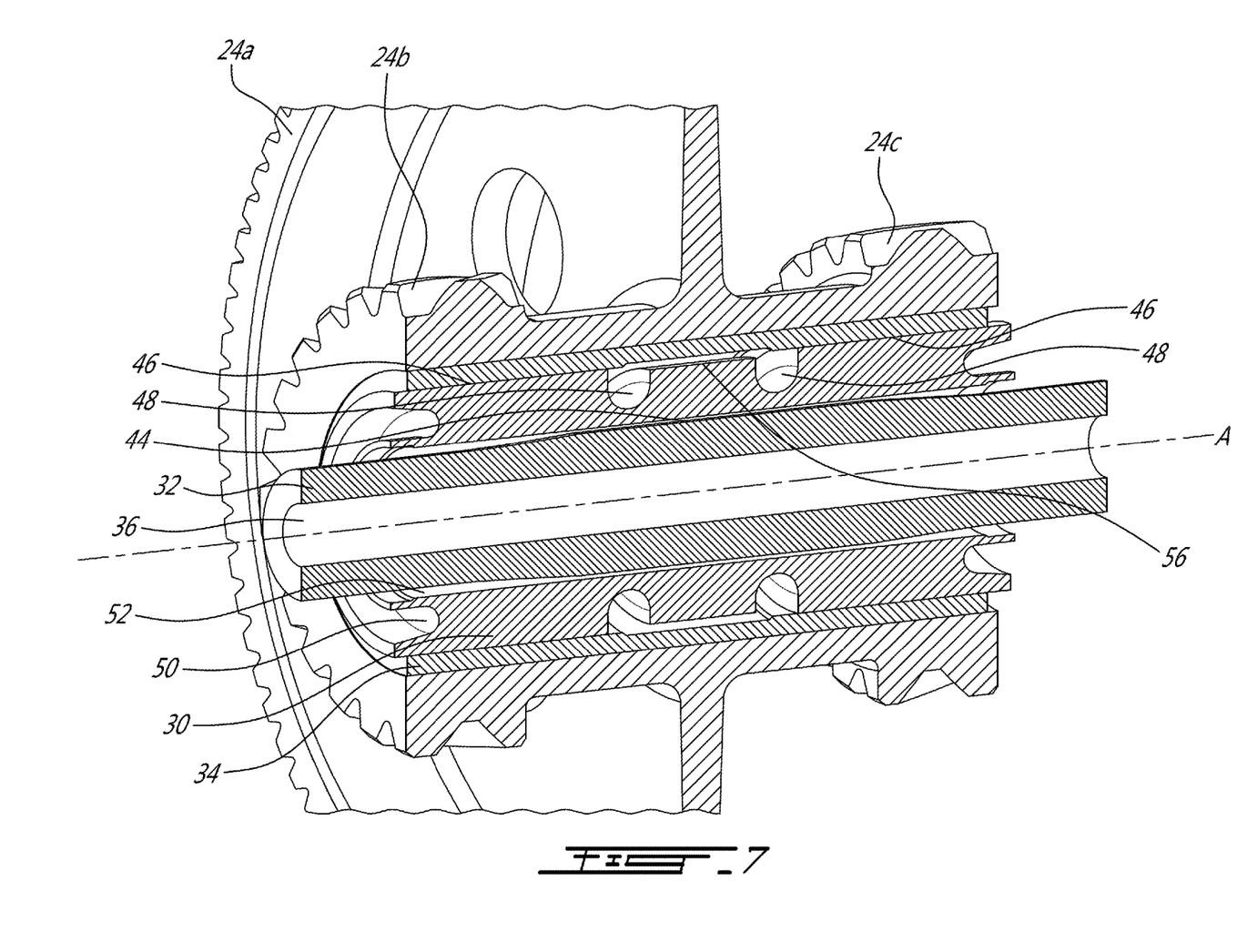
FIG. 7 is a longitudinal section perspective view of another embodiment of a journal bearing assembly according to the present disclosure.

While the embodiments of the journal bearing assembly 28 shown in FIGS. 3-5 include a single annular groove 48 with a rectangular cross-section, other possibilities in terms of shape and quantity may be implemented. As shown in FIG. 6, the annular groove 48 may include a curved cross-section. Alternatively, in the embodiment shown in FIG. 7, the journal shaft 30 may include two annular grooves 48, here shown to be of partially-circular cross-section, to account for stress and oil accumulation. While the journal shaft 30 of FIG. 7 shows a transition surface 56 between the two annular grooves 48 which does or does not make contact with the sleeve 34 (or rotating part in the absence of a sleeve) under standard conditions, in alternate embodiments the journal shaft 30 may include two or more annular grooves 48 that are each separated by contact surfaces 46 for interfacing and supporting the rotating element.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A journal bearing assembly for rotatably supporting at least one gear, comprising:
    a pin; and
    a journal shaft including an inner cavity receiving the pin and an outer surface including a plurality of contact surfaces for supporting the at least one gear and at least one annular groove separating adjacent contact surfaces;
    wherein the pin has a bump configured to support the journal shaft at a support position in the inner cavity, the support position positioned at the longitudinal center of the journal shaft.

2. The journal bearing assembly as defined in claim 1, wherein the at least one annular groove is positioned at the longitudinal center of the journal shaft.

3. The journal bearing assembly as defined in claim 1, wherein the at least one annular groove includes a rectangular cross-section.

4. The journal bearing assembly as defined in claim 1, wherein the at least one annular groove includes a curved cross-section.

5. The journal bearing assembly as defined in claim 1, further comprising a compliance gap at each distal end of the journal shaft.

6. The journal bearing assembly as defined in claim 5, wherein each compliance gap includes a removed section of the journal shaft.

7. The journal bearing assembly as defined in claim 5, wherein each compliance gap includes one of a tapered or curved shape.

8. The journal bearing assembly as defined in claim 5, wherein each compliance gap is formed adjacent the bump in the pin.

9. A gas turbine engine comprising:
    a gearbox having a plurality of gears; and
    a journal bearing assembly including a supporting pin and a journal shaft including an inner cavity receiving the supporting pin and an outer surface including a plurality of contact surfaces rotatably supporting at least one of the plurality of gears and at least one annular groove separating adjacent contact surfaces, wherein the pin has a bump configured to support the journal shaft in the inner cavity at the longitudinal center of the journal shaft.

10. The gas turbine engine as defined in claim 9, wherein the gearbox is a compound planetary gearbox including a sun shaft, a sun gear, a plurality of planet gears, a gear carrier and a ring gear.

11. The gas turbine engine as defined in claim 10, wherein at least two planet gears are supported by the journal shaft and interconnected for concurrent rotation.

12. The gas turbine engine as defined in claim 9, wherein three planet gears are supported by the journal shaft and interconnected for concurrent rotation, a larger of the three planet gears is centrally mounted on the journal shaft between the two other of the three planet gears.

13. The gas turbine engine as defined in claim 9, further comprising a sleeve disposed radially outwardly to the journal shaft, the sleeve forming an outer peripheral surface between the journal shaft and the at least one supported gear.

14. The gas turbine engine as defined in claim 9, wherein the at least one annular groove is positioned at the longitudinal center of the journal shaft.

15. The gas turbine engine as defined in claim 9, wherein the at least one annular groove includes a rectangular cross-section.

16. The gas turbine engine as defined in claim 9, wherein the at least one annular groove includes a curved cross-section.

17. A method for rotatably supporting at least one gear in a gearbox, comprising:
    mounting the at least one gear onto a journal bearing assembly including a journal shaft and a pin inserted into an inner cavity of the journal shaft, the pin having a bump supporting the journal shaft in the inner cavity at the longitudinal center of the journal shaft, the at least one gear rotatable about a longitudinal axis of the journal bearing assembly; and
    positioning at least two contact surfaces on an outside surface of the journal shaft to rotatably support the at least one gear, the at least two contact surfaces separated by an annular groove.

18. The method as defined by claim 17, further comprising fitting an annular sleeve between the journal shaft and the at least one gear to be supported.

* * * * *